United States Patent
Hübner

(10) Patent No.: US 8,499,910 B2
(45) Date of Patent: Aug. 6, 2013

(54) DEVICE FOR TRANSMITTING ELECTRICAL ENERGY

(75) Inventor: Burkhard Hübner, Berlin (DE)

(73) Assignee: Stemmann-Technik GmbH, Schüttorf (DE)

( * ) Notice: Subject to any disclaimer, the term of this patent is extended or adjusted under 35 U.S.C. 154(b) by 226 days.

(21) Appl. No.: 13/129,643

(22) PCT Filed: Nov. 9, 2009

(86) PCT No.: PCT/EP2009/064824
§ 371 (c)(1),
(2), (4) Date: May 17, 2011

(87) PCT Pub. No.: WO2010/057799
PCT Pub. Date: May 27, 2010

(65) Prior Publication Data
US 2011/0220446 A1 Sep. 15, 2011

(30) Foreign Application Priority Data

Nov. 18, 2008 (DE) .................... 20 2008 015 230 U
Sep. 8, 2009 (DE) .................... 20 2009 012 151 U

(51) Int. Cl.
*B60L 9/00* (2006.01)
(52) U.S. Cl.
USPC ............................................ 191/10; 180/2.1
(58) Field of Classification Search
USPC .... 191/6, 10, 14, 18, 22 C; 180/2.1; 320/109; 104/281, 284
See application file for complete search history.

(56) References Cited

U.S. PATENT DOCUMENTS

| 4,139,071 | A | * | 2/1979 | Tackett | 180/165 |
| 4,476,947 | A | * | 10/1984 | Rynbrandt | 180/2.1 |
| 5,045,646 | A | * | 9/1991 | Musachio | 191/6 |

(Continued)

FOREIGN PATENT DOCUMENTS

| DE | 42 36 286 A1 | 5/1994 |
| DE | 42 36 340 A1 | 5/1994 |

(Continued)

*Primary Examiner* — S. Joseph Morano
*Assistant Examiner* — Zachary Kuhfuss
(74) *Attorney, Agent, or Firm* — Henry M. Feiereisen LLC

(57) ABSTRACT

The invention relates to a device for inductively transmitting electrical energy to or from a mobile object (3) that is located on a roadway or rail, is at a standstill or in motion, and comprises a load and/or an energy store, comprising a floor inductor (5) that is associated with the roadway (1) and comprises a plurality of first induction coils (4) that are arranged along the roadway (1) or rail, are connected to a current source, and have a magnetically conductive iron core (6) for generating a magnetic field directed toward the moving object (3). An inductive wheel (8) attached to the moving object (3) comprises a stationary second induction coil (9) having a magnetically conductive iron core (10) and magnetically conductive wheel disks (11, 12) that are directed toward the roadway (1) or rail and connected to said magnetically conductive iron core on both sides. Elastic, magnetically conductive tires (13) rotating with the motion of the object (3) are associated with the wheel disks for contacting the roadway (1) and for ensuring a low-loss magnetic flux between the induction coils (4, 9), wherein in the flattened state, said tires securely bridge an air gap between the roadway and wheel disks. The device can be used advantageously in connection with electric vehicles for comfortably and quickly recharging the batteries during driving or parking.

11 Claims, 3 Drawing Sheets

U.S. PATENT DOCUMENTS

| | | | | |
|---|---|---|---|---|
| 5,174,215 A | * | 12/1992 | Barrows | 104/288 |
| 5,669,470 A | * | 9/1997 | Ross | 191/10 |
| 6,510,799 B2 | * | 1/2003 | Lamb et al. | 104/281 |
| 6,803,744 B1 | | 10/2004 | Sabo | |
| 8,167,772 B2 | * | 5/2012 | Stoicoviciu et al. | 477/5 |
| 8,220,568 B2 | * | 7/2012 | Stoicoviciu | 180/2.1 |
| 8,240,406 B2 | * | 8/2012 | Stoicoviciu et al. | 180/2.1 |
| 8,307,967 B2 | * | 11/2012 | Patwardhan | 191/2 |
| 2011/0031047 A1 | * | 2/2011 | Tarr | 180/65.1 |
| 2011/0106349 A1 | * | 5/2011 | Sakita | 701/22 |
| 2012/0025629 A1 | * | 2/2012 | Stoicoviciu | 307/104 |

FOREIGN PATENT DOCUMENTS

| | | |
|---|---|---|
| DE | 198 24 290 A1 | 12/1999 |
| EP | 0 289 868 A2 | 11/1988 |
| EP | 1 337 001 A1 | 8/2003 |

* cited by examiner

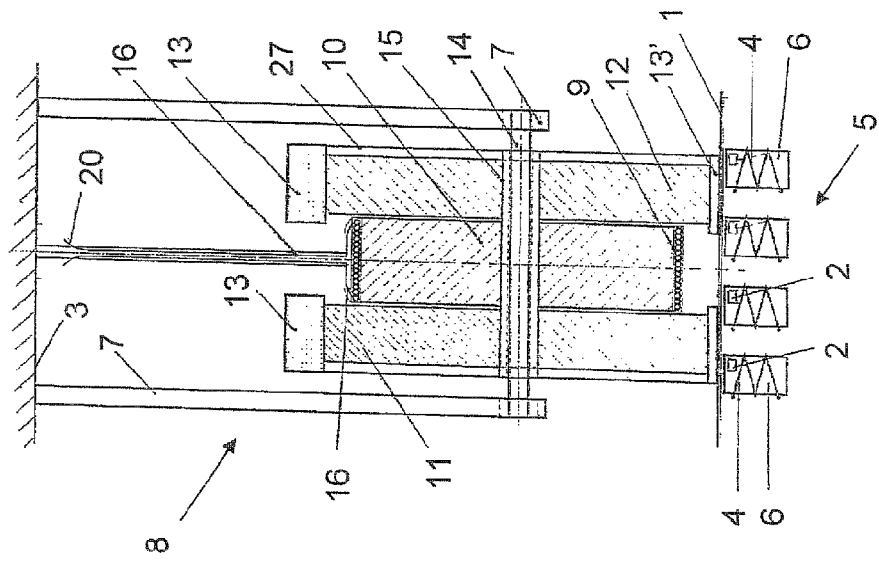
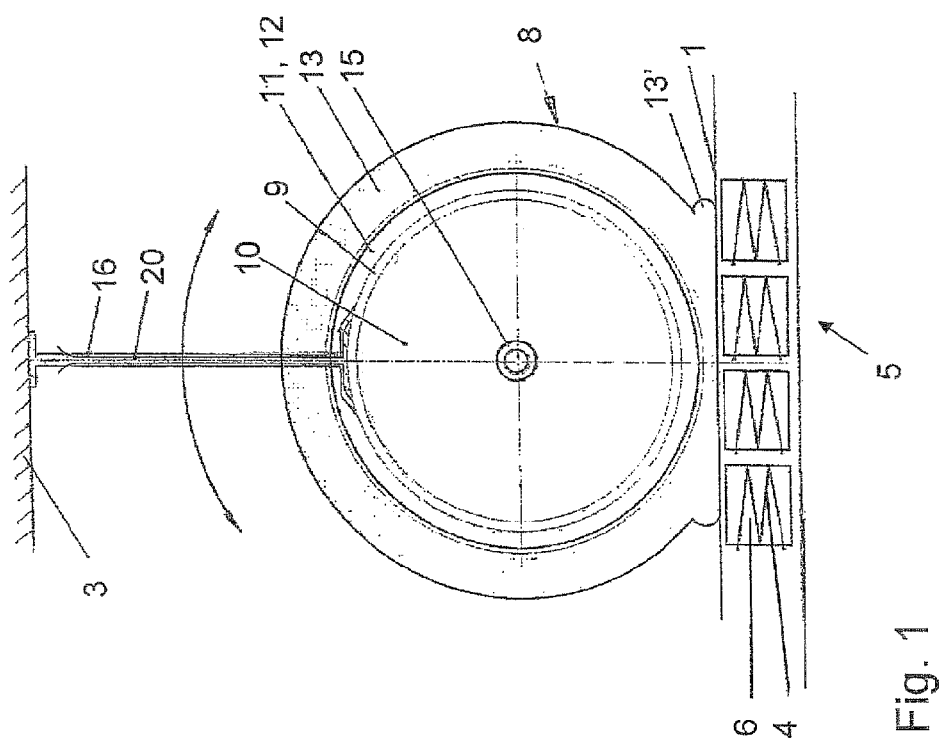

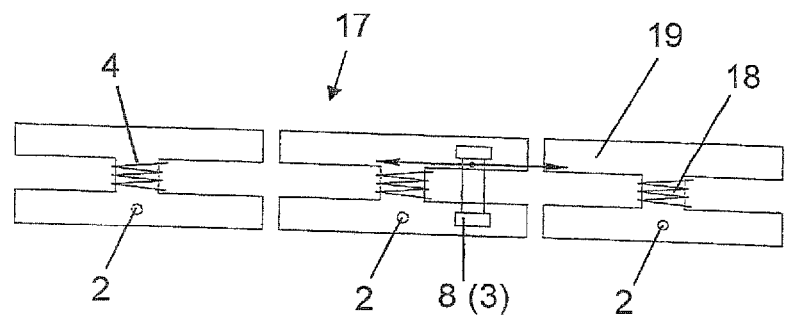
Fig. 3
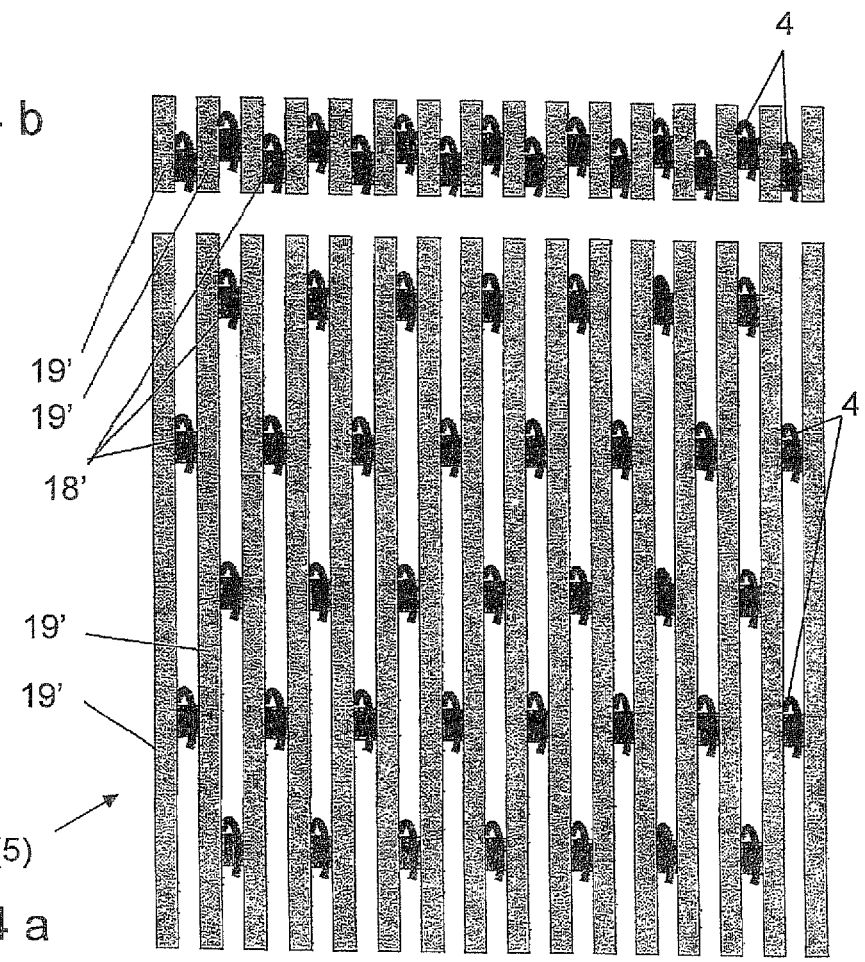
Fig. 4 b
Fig. 4 a

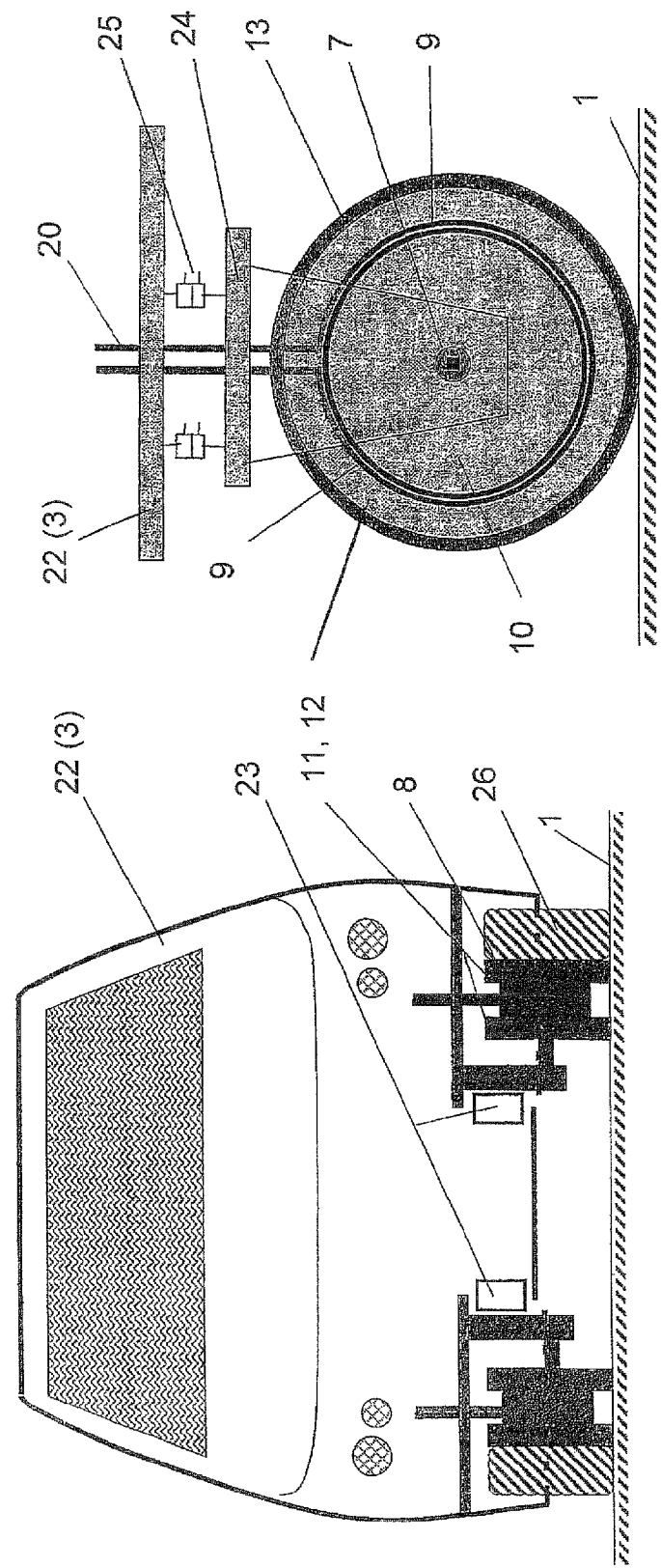

DEVICE FOR TRANSMITTING ELECTRICAL ENERGY

CROSS-REFERENCES TO RELATED APPLICATIONS

This application is the U.S. National Stage of International Application No. PCT/EP2009/064824, filed Nov. 9, 2009, which designated the United States and has been published as International Publication No. WO 2010/057799 and which claims the priorities of German Patent Applications, Serial No. 202008015230, filed Nov. 18, 2008, and 202009012151.8, filed Sep. 8, 2009, pursuant to 35 U.S.C. 119(a)-(d).

BACKGROUND OF THE INVENTION

The invention relates to a device for inductive transmission of electric energy to or from a mobile object which is at a standstill or in motion on a roadway or rail and includes a load and/or energy store.

In many areas of the industry and logistics, for example in production plants or mobile objects such as railways, floor conveyors, electric cars, crane facilities, gantries, or the like, but also in truck trailers, wagons, or cooling containers, there is a need for supply with electric energy which is normally made available with the assistance of sliding contacts and power chains or by means of battery and charging cable. Besides a lack of freedom of movement and shutdown times, this type of energy transmission is disadvantageous because of their tendency to fail and the need for complex maintenance. Furthermore, a method for inductive, contactless energy transmission through transformers with air gap is known for example from EP 1337001 B1 or DE 4236340 C2, to address the afore-mentioned drawbacks and to allow transmission of powers up to the megawatts range free of maintenance. Apart from the upwardly limited efficiency, the utilization of the inductive energy transmission requires considerable constructive efforts as a result of the small air gap which needs to be kept constant and the high standards in terms of condition and cleanliness of the subsurface.

The individual transportation is directed to the development of electric cars which are supplied with electric energy by means of accumulators. The energy transmission for charging the accumulators takes place conventionally when the vehicle is at a standstill, using known plug-type solutions at fixed charging stations which are disadvantageous for the user because of the lengthy charging time and the accompanying waiting time. Also any replacement of discharged accumulators is very time-consuming. Moreover, costs for the accumulators and their weight are high.

SUMMARY OF THE INVENTION

The invention is based on the object to develop a device for inductive transmission of electric energy to mobile objects, which device is simple in construction and requires little maintenance and which ensures a low-loss and rapid energy transmission when the mobile object is idle or in motion even on dirty roads.

This object is attained in accordance with the invention by an apparatus for inductive transmission of electric energy to or from a mobile object which is at a standstill or in motion on a roadway or rail and includes a load and/or energy store, including a floor inductor which is associated to the roadway or rail and has a plurality of first induction coils which are arranged along the roadway or rail and connected to a power source and which have a magnetically conductive iron core for generating a magnetic field directed to the mobile object, and an inductive wheel attached to the mobile object and including a fixed second induction coil with a magnetically conductive iron core and magnetically conductive wheel disks connected on both sides to the iron core and directed toward the roadway or rail, wherein elastic, magnetically conductive tires rotating with the motion of the object are associated to the wheel disks for contacting the roadway in the absence of an air gap and for ensuring a low-loss magnetic flux. Advantageous or appropriate refinements of the invention are the subject matter of the sub-claims.

The basic idea of the invention resides in the inductive transmission of electric energy to or from a mobile object which is at a standstill or in motion on a roadway or rail and includes a load, for example an electric motor or a cooling unit, and/or an energy store, with the assistance of a floor inductor which is associated to the roadway or rail as well as of an inductive wheel attached to the mobile object and contacting the floor inductor, i.e. a wheel that receives or emits a magnetic flux. The floor inductor includes a plurality of first induction coils which are arranged in the roadway or along a rail and connected to a power source and which have a magnetically conductive iron core for generating a magnetic field directed to the mobile object. The inductive wheel includes a fixed second induction coil with a magnetically conductive iron core and magnetically conductive wheel disks connected on both sides to the iron core and directed toward the roadway or rail. Elastic, magnetically conductive tires rotating with the motion of the object are associated to the wheel disks for contacting the roadway or rail and for prevention of the air gap and thus to ensure a low-loss magnetic flux. The proposed device ensures a low-loss, convenient, rugged and rapid inductive energy transmission between a roadway or rail and an object located thereon, in both directions at a standstill and when the object is in motion.

According to a first variant of the embodiment, the wheel disks with the iron core and the second induction coil are securely held on the moving object, while the magnetically conductive tires are attached to a rim rotating about the second induction coil. The tires being flattened on the roadway are pressed on both sides into the air gap remaining between the wheel disks and the roadway (rail) to close the air gap and to realize a low-loss magnetic flux between the first induction coil of the floor inductor and the second induction coil of the inductive wheel.

According to a still other embodiment of the inductive wheel, wheel disks configured as full circle are rotatably attached together with the iron core on the mobile object, and the magnetically conductive tires are respectively attached at the outer circumference of the wheel disks, whereas the second induction coil is connected via a restraining element firmly with the moving object.

According to a configuration of the invention, the tires are made of magnetically conductive elastomer.

The floor inductor may be arranged in or on the floor but also in or on a wall or ceiling and can extend in any direction to suit the course of the roadway or rail.

According to a further feature of the invention, a sensor is associated to each of the induction coils of the floor inductor for ascertaining a moving object so as to connect only the one induction coil to the power grid upon which the moving object is located at a given time.

According to a further configuration of the invention, the floor inductor includes two or more longitudinal rails arranged in spaced-apart parallel relationship and made of magnetically conductive material and connected by crosspieces on which the induction coils are arranged. The floor inductor may be configured as twin rail inductor having a plurality of successively arranged segments, each comprised of two longitudinal rails interconnected by a crosspiece which receives the first induction coil, or as modular large-area grid inductor comprised of a plurality of parallel longitudinal rails connected by crosspieces with mounted inductor coil.

According to a preferred variant of the embodiment, the moving object is an electric car which is operated by means of an energy store and on which the inductive wheel is fastened and temporarily secured for lowering on a low-speed or stoppage zone, configured as grid inductor, of a roadway or parking lot for recharging the accumulators. The application of the energy transmitting system according to the invention for electric cars is advantageous with respect to the accumulators because of the simple, convenient and rapid recharging and because of the weight and cost saving aspects.

According to a configuration of the invention, the temporary lowering of the inductive wheel can be implemented in automobiles by changing the tire pressure or the axle alignment. According to a further configuration of the invention, the inductive wheel held by a mounting plate upon the electric car may also be lowered by means of a fold-out mechanism onto the roadway configured with an induction grid.

BRIEF DESCRIPTION OF THE DRAWING

Exemplary embodiments of the invention will be described in greater detail with reference to the drawing, in which:

FIG. 1 shows a basic illustration of a device for inductive transmission of electric energy to a mobile object with attached inductive wheel;

FIG. 2 shows a sectional illustration of the device depicted in FIG. 1;

FIG. 3 shows a plan view onto a twin rail inductor, comprised of segments arranged in a row, for rail-bound mobile objects;

FIGS. 4a/b show a plan view and a front view of a grid inductor intended for integration in a roadway for energy transmission to an individually operable electric car to supply motive power or to transmit or store energy;

FIG. 5 shows an individually operable electric vehicle located on a roadway with integrated grid inductor; and FIG. 6 shows a device for transmitting electric energy according to FIG. 1 which device can be pressed by a vehicle against a roadway.

DETAILED DESCRIPTION OF PREFERRED EMBODIMENTS

As shown in FIGS. 1 and 2, a plurality of first induction coils 4, wound about an iron core 6 and connected by an energy power grid to an alternating voltage in the low-frequency range, are arranged in the area of a roadway 1 on which an electrically operated mobile object 3 is intended for travel. The first induction coils form in their entirety a floor inductor 5 and produce an upwardly directed magnetic field. The connection of the first induction coils 4 along the roadway to the power grid is controlled in dependence on the moving object 3 located on the roadway 1, i.e. only the induction coils 4 located at any given time in the area of the moving object 3 are activated. Sensors 2 are associated to the induction coils 4 to recognize the moving object 3.

The moving object 3, hinted only in FIGS. 1 and 2, includes an inductive wheel 8 which is supported on a mounting 7 for rotation about a wheel axis 14 and has a bearing bushing 15 which includes a magnetically conductive—laminated—iron core 10, which is surrounded by a second induction coil 9, and magnetically conductive—laminated—wheel disks 11 and 12 on both sides of the iron core. Attached to the outer surface of the wheel disks 11, 12 is a non-magnetic cover plate 17. The second induction coil 9 is attached to a restraining element 16 connected to the mobile object 3. The outer peripheral surface of the inductive wheel 8 is formed by elastic tires which are made of magnetically conductive elastomer and contact the roadway 1 to roll off and thereby flatten or broaden flatly (flat tire 13') so as to prevent the presence of an air gap between the floor inductor 5, integrated in the roadway, and the magnetically conductive wheel disks 11, 12. Magnetic energy is transmitted with little loss between the first induction coils 4 of the floor inductor 5 and the second induction coil 9 of the inductive wheel 8 via the magnetically conductive elastomer of the tires 13 and the magnetically conductive wheel disks 11, 12 on both sides and converted into electric energy at high efficiency. The electric energy transmitted inductively in this manner is fed via a coil lead 20 and rectifier to a load provided on the moving object 3 or to capacitive energy stores (not shown). In the afore-described variant of the embodiment, the inductive wheel 8 is formed directly by magnetically conductive wheel disks 11, 12, which are rotatably supported in the mounting 7 and include the magnetically conductive tires 13 on their peripheral surface.

The invention is not limited to the afore-described exemplary embodiment of a device for inductive transmission of electric energy to or from a mobile object 3. Starting from the basic idea of the invention to implement an inductive energy transmission between a fixed floor inductor 5 and an inductive wheel 8, which is attached to the mobile object and made of magnetically conductive wheel disks 11, 12 and to which magnetically conductive elastomer is associated, for realizing a low-loss magnetic flux absent an air gap, it is however also conceivable to fixedly secure the wheel disks and to provide the magnetically conductive elastomer, associated to the wheel disks for air gap suppression, on a mounting fastened to the mobile object.

The proposed device enables an inductive transmission of electric energy at standstill and when the mobile object is in motion in both directions between the fixed floor inductor and the inductive wheel traveling thereon. The device is applicable for rail-bound mobile objects, for example railways or similar transport means as well as for objects that are not bound to a given travel path, for example the individual transportation with electric cars traveling on a roadway. Accordingly, the floor inductor 5 is configured either as a twin rail inductor 17 suited to the inductive wheel 8 on which the wheel, configured here as the wheel disks 11, 12 with the elastic tires 13 and provided with the magnetically conductive elastomer, rolls off in the direction of the rail course, or the floor inductor 5 is a grid inductor 21 which is incorporated in a roadway or configured as a large-area mat and on which a freely movable electric vehicle is able to travel in any direction or is positioned at a standstill during the energy transmission.

FIG. 3 shows a plurality of successively arranged segments or modules of a twin rail inductor 17 which include each in accordance with the configuration of the inductive wheel 8 according to FIGS. 1 and 2, two longitudinal rails 19 connected by a crosspiece 18 and made of magnetically conductive material and induction coils 4 secured to the crosspiece 18. Sensors 2 are arranged at level with the respective induction coil 4 to recognize a mobile object 3 located above the induction coil 4 and to initiate the connection of the respective first induction coil 4 to the power grid and to inductively transmit the electric energy to a store or load of the moving object 3 positioned at that moment above the induction coil 4.

FIGS. 4a and b show a plan view and a front view of a grid inductor 21 configured for the individual transportation with electric cars. The grid inductor 21 includes a plurality of longitudinal rails 19' disposed in parallel spaced-apart relationship and interconnected by crosspieces 18' disposed offset longitudinally and vertically and having arranged thereon—individually activatable—induction coils 4. The longitudinal rails 19' and the crosspieces 18' are made of magnetically conductive material. The grid inductor 21 is comprised of several grid inductor sections (not shown) arranged behind one another.

A particular field of application of the afore-described device for inductive energy transmission involves electric cars whose use is limited by the high weight and high costs for the accumulators and time-consuming charging. FIG. 5 shows an electric car 22 which is equipped with accumulators (not shown) for providing the required electric motive power and has wheels 23 to which an inductive wheel 8 configured according to FIGS. 1 and 2 is associated. The inductive wheel 8 which during normal travel does not touch the roadway 1 can be temporarily lowered onto the roadway 1 when a floor inductor 5 provided in or on the road pavement and configured as grid inductor 21 is involved so that an energy transmission to the drive motor or to the accumulators of the electric car 22 can be established when the first induction coils 4 are connected to the power grid and the elastic, magnetically conductive tires 13 are pressed against the roadway 1. Lowering of the inductive wheel onto the roadway 1 may be realized for example by reducing the air pressure in the vehicle tires 26 or by changing the alignment of the axle in relation to the inductive wheel 8. Lowering and implementation of a correct position of the inductive wheel 8 on the roadway 1 is realized with the assistance of control elements 23. The afore-mentioned sensors 2 which are arranged in the grid inductor 21 determine the position of the vehicle tires and control the current supply to the respective coils with alternating voltage in the low-frequency range. Activation takes place only when the vehicle recognition has been ascertained in order to correctly compute the energy consumption. FIG. 6 shows an inductive wheel 8 which is secured to the electric car 22 independently of the vehicle tires and has attached thereon a mounting plate 24 which is connected to the electric car by a fold-out mechanism 25, not described in greater detail, and causes a lowering of the inductive wheel 8 onto a roadway 1 with integrated grid inductor 21. The inductive wheel mounted to the electric car 22 can be lowered onto the roadway 1 provided with the inductor grid 21, when being at standstill, for example in parking lots or at intersections, or when the vehicle is in motion, for example in low-speed zones in a residential area, for recharging the accumulators in the meantime. This simple and convenient way of recharging reduces the required storage capacity and lowers weight and costs of the accumulators.

The invention claimed is:

1. A device for inductive transmission of electric energy to or from a mobile object which is at a standstill or in motion on a roadway or rail and includes a load and/or energy store, said device comprising:
    a floor inductor associated to the roadway or rail and having a plurality of first induction coils which are arranged along the roadway or rail and connected to a power source and which have a magnetically conductive iron core for generating a magnetic field directed to the mobile object; and
    an inductive wheel attached to the mobile object, said inductive wheel including
        a fixed second induction coil with a magnetically conductive iron core,
        magnetically conductive wheel disks connected on both sides to the iron core and directed toward the roadway or rail, and
        elastic, magnetically conductive tires rotating with the motion of the object and associated to the wheel disks for contacting the roadway in the absence of an air gap and for ensuring a low-loss magnetic flux.

2. The device of claim 1, wherein the wheel disks with the iron core are securely held on the moving object, and the magnetically conductive tires are attached to a rim rotating about the second induction coil.

3. The device of claim 1, wherein the wheel disks with the iron core are held rotatably on the moving object, and the magnetically conductive tires are attached at an outer circumference of the wheel disks.

4. The device of claim 1, wherein the tires are made of magnetically conductive elastomer.

5. The device of claim 1, further comprising sensors operably connected to the first induction coils of the floor inductor in one-to-one correspondence for ascertaining the moving object and control of a connection of a respective one of the first induction coils with a power grid.

6. The device of claim 1, wherein the floor inductor includes two or more longitudinal rails arranged in spaced-apart parallel relationship and made of magnetically conductive material, and crosspieces made of magnetically conductive material which connect longitudinal rails and which have mounted thereon the first induction coils.

7. The device of claim 6, wherein the floor inductor is configured as twin rail inductor having a plurality of segments arranged in a row, each of the segments comprised of two longitudinal rails interconnected by a crosspiece which is provided with a pertaining one of the first induction coils, wherein the twin rail inductor is associated to a randomly aligned subsurface area.

8. The device of claim 6, wherein the floor inductor is configured as flat grid inductor which is associated to a roadway zone or parking zone and includes a plurality of parallel longitudinal rails which are connected by crosspieces arranged offset between the longitudinal rails and having mounted thereon pertaining ones of the first induction coils.

9. The device of claim 1, wherein the mobile object is an electric car which is operated by accumulators and on which the inductive wheel is temporarily fastened for lowering onto a low-speed or stoppage zone of the roadway, configured with a grid inductor, or a parking lot for recharging the accumulators.

10. The device of claim 9, wherein the inductive wheel is associated to vehicle tires of the electric car and is lowerable by changing a tire pressure or an axle alignment.

11. The device of claim 9, further comprising a mounting plate to secure the inductive wheel upon the electric car, and a fold-out mechanism to lower the inductive wheel onto the roadway configured with a grid inductor.

* * * * *